July 5, 1966  J. A. VAN DEN BROEK  3,259,045
AUTOMATIC DIAPHRAGM CONTROL
Filed Oct. 28, 1958  4 Sheets-Sheet 1

INVENTOR
JAN A. VAN DEN BROEK

BY Strauch, Nolan + Neale
ATTORNEYS

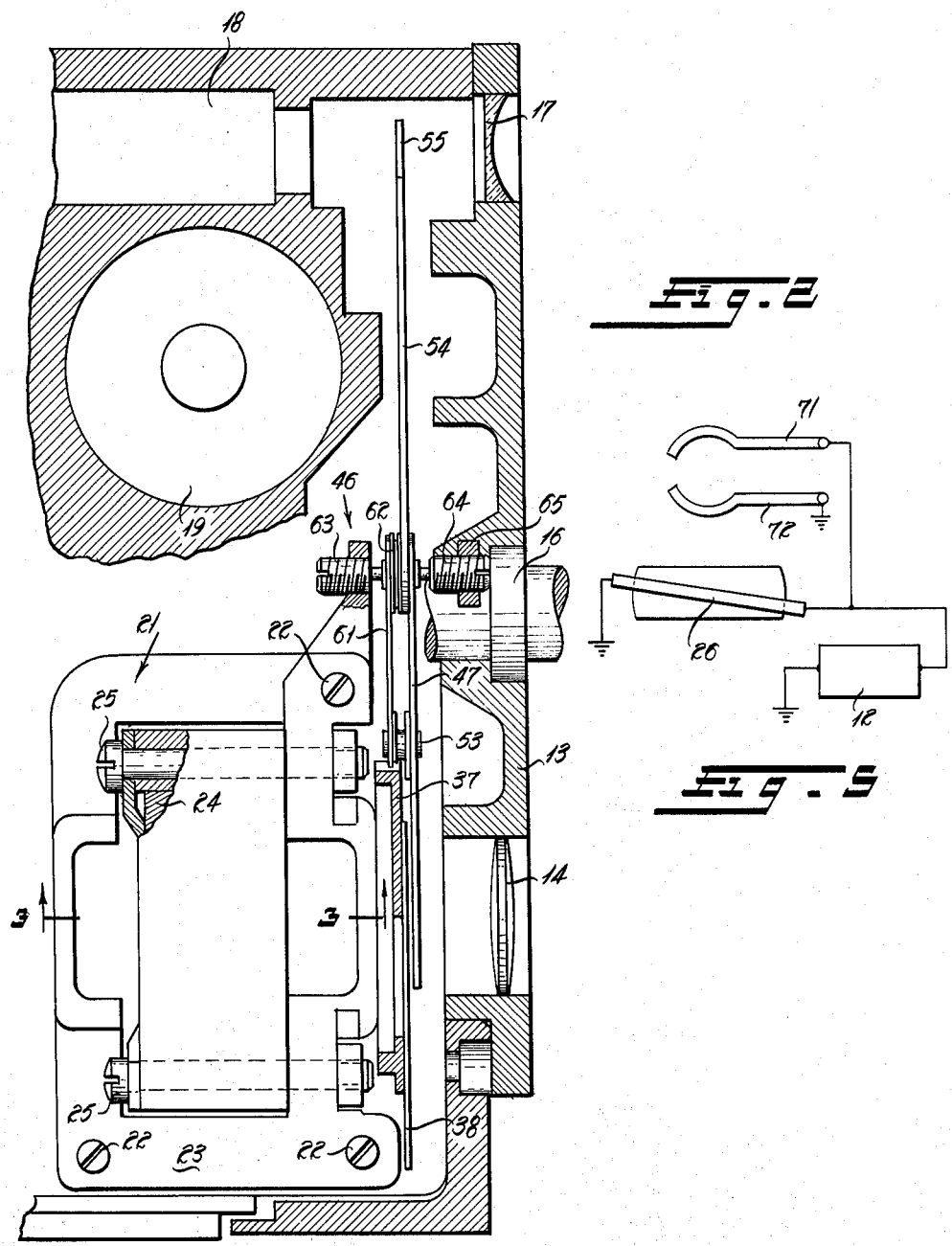

July 5, 1966  J. A. VAN DEN BROEK  3,259,045
AUTOMATIC DIAPHRAGM CONTROL
Filed Oct. 28, 1958  4 Sheets-Sheet 3
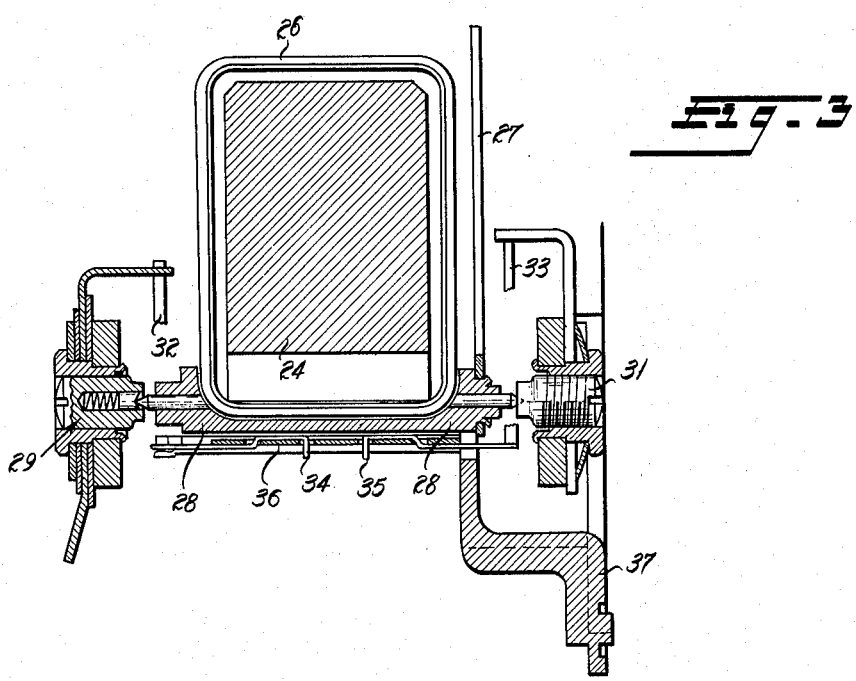
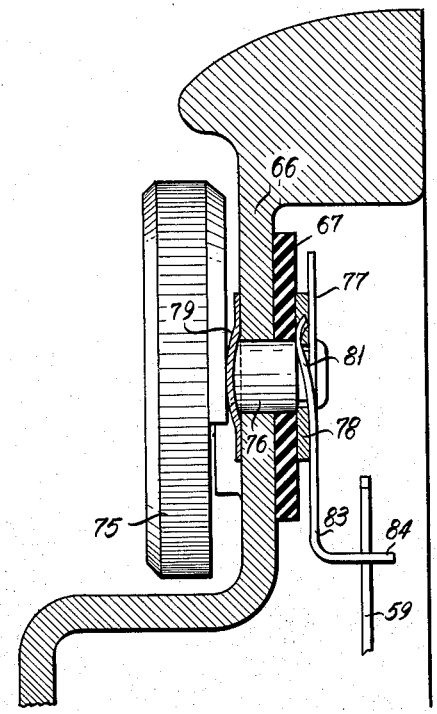
INVENTOR
JAN VAN DEN BROEK
BY Strauch, Nolan & Neale
ATTORNEYS July 5, 1966  J. A. VAN DEN BROEK  3,259,045
AUTOMATIC DIAPHRAGM CONTROL
Filed Oct. 28, 1958  4 Sheets-Sheet 4

INVENTOR
JAN A. VAN DEN BROEK
BY
Strauch, Nolan & Neale
ATTORNEYS

United States Patent Office 3,259,045
Patented July 5, 1966

3,259,045
AUTOMATIC DIAPHRAGM CONTROL
Jan A. Van den Broek, Ann Arbor, Mich., assignor, by mesne assignments, to Mansfield Industries, Inc., Chicago, Ill., a corporation of Delaware
Filed Oct. 28, 1958, Ser. No. 770,043
1 Claim. (Cl. 95—64)

This invention relates to the automatic control of light restricting means such as diaphragms for continuously controlling the amount of light passing along an optical path and it is particularly adapted for the automatic control of diaphragms in movie cameras wherein special indicating and override control mechanisms are provided.

Automatic diaphragm controls broadly for movie and other cameras have been proposed and, although many practical disadvantages attend them such as the low power generated by present-day photocells and the high inherent mechanical friction of most known diaphragm assemblies, there are some in present-day use, which are commercially successful.

The present invention is concerned with a novel diaphragm construction and control wherein the blades are constructed and arranged in a novel manner and wherein a special provision is made for disabling the automatic control and manually operating the diaphragm when the operator so desires. The invention further contemplates the provision of a special arrangement for indicating to the operator different conditions of exposure, this comprising a flag-like indicator movable into the view finder path and an associated indicator showing approximately the diaphragm exposure opening at any one time.

In its specific embodiment the invention contemplates making part of the manual control and both of these indicators as an integral part of one of the diaphragm blades.

It is therefore the major object of this invention to provide a novel diaphragm construction for a movie camera or the like wherein balanced diaphragm blades are similarly oppositely driven by power furnished by a light sensitive electric current generator.

A further object of the invention is to provide a novel diaphragm blade construction which is of particular value in automatic movie camera diaphragm control due to special slot construction.

A further object of the invention is to provide a novel automatic diaphragm arrangement for movie cameras or the like wherein two essentially similar diaphragm vanes are inter-geared for opposite rotation and driven by a motor that is powered by a light sensitive cell exposed to light from the direction of the subject to be photographed.

It is a further object of the invention to provide a novel manual override arrangement for an automatic exposure control in a movie camera or the like wherein selection of manual control automatically electrically disables automatic control of the diaphragm.

It is a further object of the invention to provide a novel normally disabled switch and diaphragm pick-up mechanism for a movie camera equipped with automatic diaphragm control.

A further object of the invention is to provide a novel indicator arrangement in an automatic diaphragm control for a movie camera or the like wherein two separate indicator devices movable with one of the diaphram vanes exhibit signals at the view finder path and a diaphragm opening scale respectively and both visible to the operator from the back of the camera.

A further object of the invention is to provide a novel diaphragm construction for a movie camera or the like wherein an apertured light control vane, a manual pick-up arm and a plurality of different indicator arms are all secured in statically balanced relation about the pivot axis of the vane.

It is a further object of the invention to provide a movie camera wherein the turret axis is off-set laterally with respect to a line joining corresponding view finder and objective lens axes so as to provide for minimum camera dimensions without obstructing any of the optical paths or interfering with the action of the mechanisms.

Further objects of the invention will appear as the description proceeds in connection with the annexed claim and the appended drawings, wherein:

FIGURE 2 is a section essentially through the optical and turret axes of the camera showing the relative arrangement of the vanes and other parts;

FIGURE 3 is a section essentially along line 3—3 of FIGURE 2 showing the mounting of the diaphragm motor coil on its arbor and the connections of the arbor to one of the diaphragm vanes.

FIGURE 4 is a section essentially on line 4—4 of FIGURE 1 showing the switch and manual pick-up construction somewhat enlarged;

FIGURE 5 is a diagrammatic photocell circuit;

Figure 1:
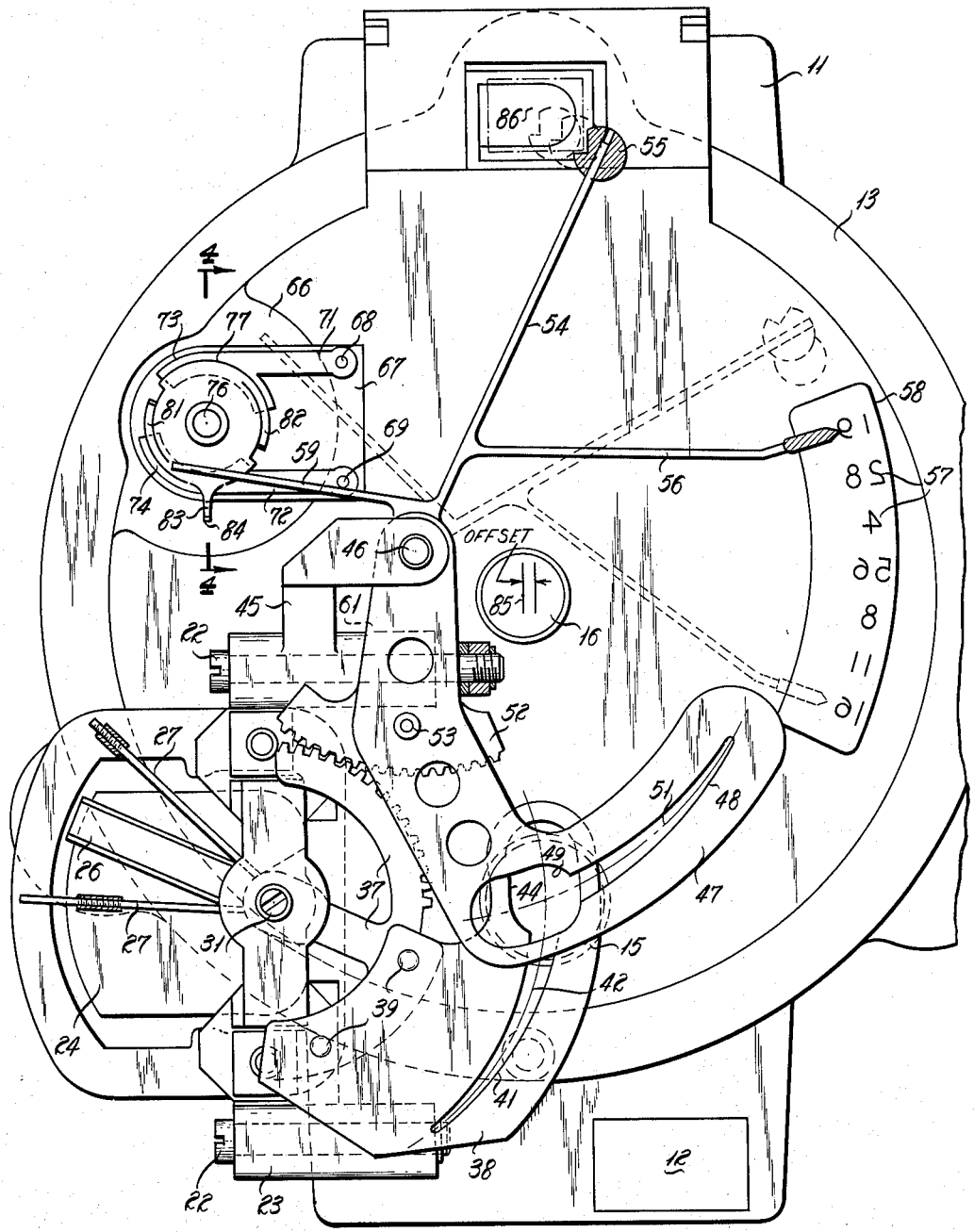
FIGURE 1 is a front elevation of a camera with many of the conventional camera parts shown relatively diagrammatically and with the automatic diaphragm control of the invention shown in its preferred place in the camera for purposes of optimum illustration.

The camera body 11 has suitably mounted thereon a photoelectric cell area indicated at 12. This cell may be at any part of the front wall 13 of the camera where it is exposed to essentially the same light that enters the picture taking lens 14 mounted on that wall in axial alignment with an exposure aperture indicated in FIGURE 1 at 15. A turret mounting spindle 16 extends through the camera front wall but the turret is not shown in FIGURE 1 for the sake of clarity of disclosure.

In the upper part of wall 13 (FIGURE 2) a view finder field lens 17 is mounted in alignment with other view finder optics at 18. Below the finder is an internal body chamber at 19.

An electric motor and diaphragm plate assembly 21 is removably mounted in the lower front part of the camera as by screws 22 that enter suitable internal camera wall bosses.

This assembly comprises a fixed frame 23 on which is secured magnet 24 as by bolts 25. A coil 26 that encompasses the magnet is provided with suitable balancing counterweights 27. Coil 26 is secured at one side to an arbor 28 (FIGURE 3) that is rotatably mounted at opposite ends in substantially frictionless pivot structures 29 and 31. Suitable coil springs 32 and 33 serve both as lead-in wires to the coil, as shown in FIGURE 3, and to bias the arbor clockwise in FIGURE 1. The inner ends of springs 32 and 33 are connected to straps 34 and 35 respectively supported on insulating strip 36 on arbor 28.

Arbor 28 has secured thereon a spur gear sector 37, and a diaphragm plate 38 is fixed on gear sector 37 as by rivets 39. Thus plate 38 swings directly with coil 26. Plate 38 is formed with an arcuate slot 41 the center of which lies on a circular line 42 having its center on the axis of arbor 28 and intersecting the optical axis 43 passing through lens 14. The slot 41 is formed at its larger end with an abruptly enlarged oval section at 44.

Frame 23 has an upward extension 45 providing support for a pivot structure 46 on which is rotatably mounted a diaphragm plate 47 having a similar acruate slot 48 terminating in its larger end in a large oval section 49.

The centerline 51 of slot 48 lies on a circle centered on the axis of pivot 46 and intersecting the optical axis 43, and pivot 46 and arbor 28 have parallel axes.

A gear segment 52 is constantly meshed with gear 37 on the motor coil arbor, is journalled on the pivot at 46 and is fixed to plate 47 as by rivets 53. Thus when coil 26, which is suitably electrically connected to the photocell at 12, swings in response to incident light, the slots 41 and 48 respectively of diaphragm plates 38 and 47 swing oppositely and equally about pivots 28 and 46 and the slots 41 and 48 overlap at the exposure aperture so as to provide a variable size always centered effective exposure aperture on the optical axis.

When no light is incident on cell 12, or the cell is otherwise prevented from energizing its circuit, as by covering it with a shutter or short circuiting it, the biasing springs 32 and 33 are effective to swing coil 26 clockwise in FIGURE 1 so that maximum apertures 44, 49, are disposed at the exposure axis.

An extension arm 54 on plate 47 terminating in a colored signal button 55 adapted to extend within the view finder field of view is provided to indicate to the operator whether or not maximum opening prevails. Also a further extension arm 56 is provided for plate 47 to coact as a pointer with a diaphragm value scale 57 viewable through an aperture 58 at the rear of the housing wall as shown in FIGURE 1. Another extension arm 59 is provided for plate 47 for a purpose to appear.

Referring to FIGURE 2 the preferable detail as to the upper diaphragm plate pivot structure is shown wherein gear segment 52 has a leg 61 secured upon pivot hub 62 which in turn has secured thereon plate 47. The rivet 53 also serves as a spacer between gear 52 and plate 47. Hub 62 is oppositely supported in centered pivot point sockets on the ends of adjustable pivot screws 63 and 64, the latter being mounted in a fixed internal lug 65 in the camera.

It will be observed that the vane 47 together with hub 62, gear sector 47 and the stamping comprising arms 54, 56 and 59 constitute a rigid assembly that rotates and is statically balanced about the axis of pivot 46. Further the vane 38 together with the arbor 28, coil 26 and the counterbalances 27 constitutes a rigid assembly that is statically balanced about the pivot axis of arbor 28. Finally the parts are so proportioned with respect to their moments about their respective axes that the geared together assemblies constitute a dynamically balanced diaphragm. By this I mean that the application of any shock or like force to the camera, such as may occur when the camera is swept to follow a subject, or spring motor vibration, will not result in fluttering of the blades 38 and 47 to undesirably change exposure but will produce in each such statically balanced assembly a torque that is equal and opposite to the other so that the diaphragm blades are not affected by such forces and are controlled only by the photocell response, or by manual control as will appear.

Under certain light conditions it will be desirable to manually set the positions of the diaphragm blades 38 and 47. This is accomplished in the invention by the manual control shown in FIGURES 1 and 4.

Within a flat section of the camera side wall at 66 is secured a mounting plate 67 of electrically insulating material on which are fixed electric terminals 68 and 69 in the photocell circuit, and these terminals have secured thereto flat contact strips 71 and 72 terminating in diametrically opposite arcuate sectors 73 and 74 respectively.

A manually operable button 75 externally on the camera has a shaft 76 journalled in the camera wall and projecting through plate 67. A sheet metal disc 77 is secured upon the inner end of shaft 76 to rotate therewith. A washer 78 spaces disc 77 longitudinally from plate 67, and a spring washer 79 biases the shaft 76 axially outwardly.

As shown in FIGURE 1 disc 77 has two diametrically opposite integral spring fingers 81, 82 that are bent toward plate 67 (FIGURE 4). Also integral with disc 77 is a radial extension 83 having an arm 84 adapted to pick up diaphragm blade arm 59 as will appear.

When the parts are as shown in FIGURES 1 and 4 it will be observed that the tips of spring arms 81 and 82 bear on insulating plate 67 in the spaces between the contact strips 73 and 74 so that no electrical connections are there made, and also the arm 84 is located so as not to interfere with arm 59 as the diaphragm blades are photocell actuated.

When, however, the knob 75 is turned to rotate counterclockwise in FIGURE 1 the spring arms 81 and 82 bear on the contact strips to establish an electric circuit through metal disc 77 and disable the circuit to the coil 26. Also the arm 84 now picks up arm 59 of the diaphragm blade assembly and, working in opposition to springs 32, 33, effects manual setting of the diaphragm blades with indicator arm 56 showing the setting on scale 57.

Figure 6:
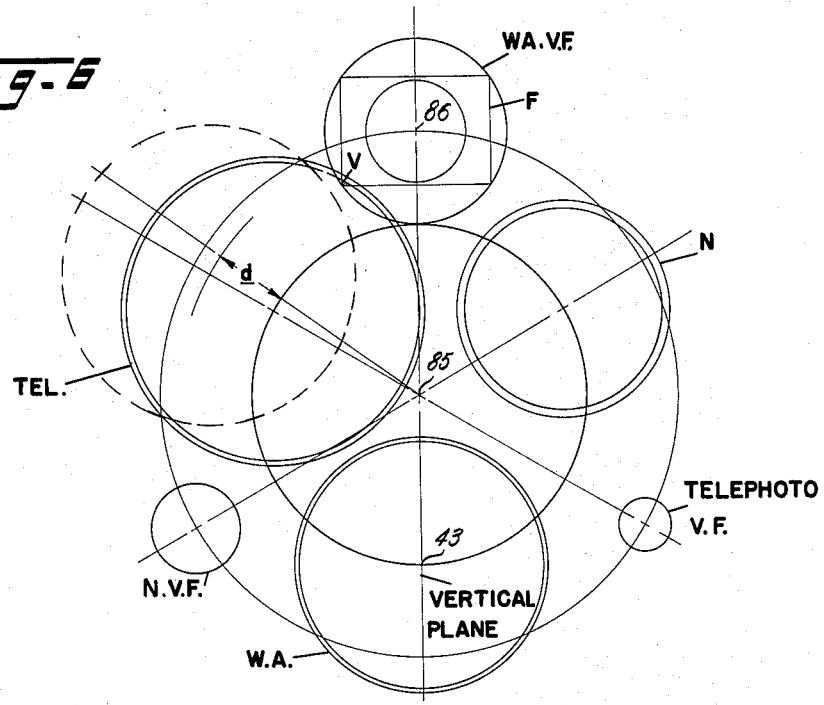
FIGURE 6 is a diagrammatic view of a view finder and turret arrangement showing the clearances that would be necessary for aligning the view finder axis and the objective axis in the same vertical plane.
Figure 7:
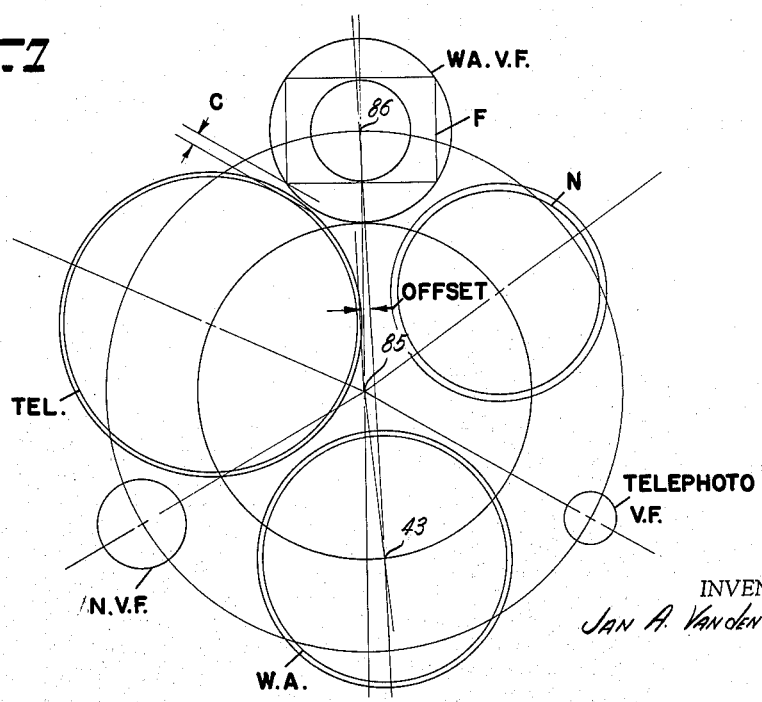
FIGURE 7 is a diagrammatic view showing the geometry of the offset axes of the objective and turret which enables more compact lens groupings in the camera.

FIGURES 6 and 7 are comparative views illustrating the advantage of the asymmetric center arrangement of the turret and camera optics.

Referring to FIGURE 6 the optical axis 43 of the objective, the turret pivot axis at 85, and the optical axis of the view finder are shown as all lying in a common vertical plane. The several supplemental objective lenses mounted on it are indicated at N (normal focal length) TEL (telephoto) and WA (wide angle). Diametrically opposite each is the corresponding supplementary view finder lens. FIGURE 6 shows the wide angle supplementary lens on the optical axis with the corresponding supplementary wide angle view finder lens on the view finder axis. The field of view of the view finder in the plane of the outer edge of the telephoto lens tube is shown at F.

It will be noted that were the lenses all mounted as shown in the solid line positions of FIGURE 6 the body tube of the telephoto lens would cut off the lower corner of the field of view of the wide angle lens in the shaded area indicated at V.

In order to avoid this undesirable vignetting of the field of view it normally would be considered necessary to shift the telephoto objective lens mount outwardly the radial distance $d$ of FIGURE 6 to the illustrated dotted line position, and of course each of the other supplementary objectives would have to be moved out similarly until their axis were on the same circle. This would result in unduly increasing the camera dimensions.

The problem is solved according to the invention by the arrangement shown in FIGURE 7, wherein the turret pivot 85 is offset with respect to a line joining the supplementary view finder and objective lenses and this asymmetrically locates all of the lens axes.

It will be noted that the view finder and objective lenses in FIGURE 7 all have their axes on the same diameter circles as in FIGURE 6 concentric with the turret axis.

The relative locations of the various axes are determined by first running a tangent to the telephoto lens body through the turret axis 85, and then drawing a straight line from the view finder lens axis 86 parallel to that tangent to intersect the lens axis circle at 43. The other objective lens axes are similarly located at the same angular displacement.

The result is that when the wide angle lens is in position before the objective axis 43 the telephoto lens tube has at least the clearance indicated at $c$ in FIGURE 7 with respect to the view finder field in the plane of its outer edge, and the lenses are all grouped at optimum minimum distance with respect to the turret axis. The turret axis 85 is thus located in lateral offset relation to the lines joining each corresponding objective and view finder lens.

In a form of the invention actually reduced to practice it was found that using the offset turret axis arrangement of FIGURE 7 (about .056" offset from the lens axis line)

the supplementary lenses could be placed with their axes on a circle of about .880" as compared to an axis circle of about 1.260" necessary for the FIGURE 6 arrangement with the lenses located sufficiently outwardly to avoid vignetting.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

An automatic diaphragm arrangement comprising an electrical instrument having a magnetic structure including a flux gap; a supporting member having a central opening formed therein, two spaced sides of the member comprising front and rear instrument bridge members; means securing the instrument magnetic system to one of the said bridge members within the central opening formed therein; a movable coil having one side passing through the flux gap formed in the magnetic structure; means pivotally mounting the movable coil between the front and rear bridge members about the coil pivot axis; a first vane secured to the movable coil and rotatable coaxially therewith; an arm extending from the supporting member; a second vane pivotably mounted on the said arm about a pivot axis parallel to the coil pivot axis; means forming first and second arcuate apertures in the respective first and second vanes, the arcuate aperture axes overlapping to form a diaphragm opening; and means coupling the first and second vanes together for simultaneous rotation of the said vanes upon rotation of the moving coil about the coil pivot axis.

References Cited by the Examiner

UNITED STATES PATENTS

| | | |
|---|---|---|
| 2,058,562 | 10/1936 | Bucky et al. |
| 2,210,882 | 8/1940 | Carter _____ 95—64 |
| 2,261,532 | 11/1941 | Tonnies _____ 95—64 |
| 2,297,262 | 9/1942 | Tonnies _____ 95—64 |
| 2,465,578 | 3/1949 | Czarnikow et al. _____ 95—64 |
| 2,556,546 | 6/1951 | Lee _____ 95—64 |
| 2,741,170 | 4/1956 | Wenke _____ 95—45 |
| 2,741,965 | 4/1956 | Thevenaz _____ 95—45 |
| 2,841,064 | 7/1958 | Bagby et al. _____ 95—64 |

FOREIGN PATENTS

| | | |
|---|---|---|
| 145,699 | 5/1936 | Austria. |
| 503,901 | 4/1939 | Great Britain. |
| 698,573 | 10/1953 | Great Britain. |

NORTON ANSHER, *Primary Examiner.*

DELBERT B. LOWE, EMIL G. ANDERSON,
*Examiners.*

L. W. VARNER, CLIFFORD B. PRICE,
*Assistant Examiners.*